US008199911B1

(12) United States Patent
Tsaur et al.

(10) Patent No.: US 8,199,911 B1
(45) Date of Patent: Jun. 12, 2012

(54) SECURE ENCRYPTION ALGORITHM FOR DATA DEDUPLICATION ON UNTRUSTED STORAGE

(75) Inventors: Ynn-Pyng "Anker" Tsaur, Oviedo, FL (US); William T. Cochran, Orlando, FL (US)

(73) Assignee: Symantec Operating Corporation, Mountain View, CA (US)

( * ) Notice: Subject to any disclaimer, the term of this patent is extended or adjusted under 35 U.S.C. 154(b) by 1106 days.

(21) Appl. No.: 12/058,833

(22) Filed: Mar. 31, 2008

(51) Int. Cl.
*H04L 9/00* (2006.01)

(52) U.S. Cl. .......... 380/44; 380/281; 380/278; 711/161; 711/162; 711/171; 707/622; 707/661; 707/646; 707/637; 707/634; 707/652; 707/602; 709/213; 709/216

(58) Field of Classification Search .................. None
See application file for complete search history.

(56) References Cited

U.S. PATENT DOCUMENTS

| | | | | |
|---|---|---|---|---|
| 6,711,677 B1 * | 3/2004 | Wiegley | ................. | 713/151 |
| 6,983,365 B1 | 1/2006 | Douceur et al. | ............. | 713/165 |
| 7,159,110 B2 | 1/2007 | Douceur et al. | ............. | 713/165 |
| 7,266,689 B2 | 9/2007 | Douceur et al. | ............. | 713/165 |
| 7,454,612 B2 * | 11/2008 | Bolosky et al. | ............. | 713/165 |
| 7,689,837 B2 * | 3/2010 | Taguchi et al. | ............. | 713/193 |
| 7,747,024 B2 * | 6/2010 | Challener | .................... | 380/278 |
| 7,779,097 B2 * | 8/2010 | Lamkin et al. | ................ | 709/223 |
| 7,886,158 B2 * | 2/2011 | Osaki | ............................ | 713/193 |
| 7,949,785 B2 * | 5/2011 | Alkhatib et al. | ............. | 709/245 |
| 8,024,762 B2 * | 9/2011 | Britt | ............................. | 725/92 |
| 8,108,638 B2 * | 1/2012 | Kishi | ........................... | 711/162 |
| 2003/0188180 A1 * | 10/2003 | Overney | ....................... | 713/193 |
| 2004/0057579 A1 * | 3/2004 | Fahrny | ............................ | 380/44 |
| 2004/0243814 A1 * | 12/2004 | Nakano et al. | ................ | 713/189 |
| 2005/0273611 A1 * | 12/2005 | Yoshimura | .................... | 713/176 |
| 2006/0129627 A1 * | 6/2006 | Phillips et al. | ................ | 709/200 |
| 2006/0182281 A1 * | 8/2006 | Taguchi et al. | ............... | 380/270 |
| 2008/0063193 A1 * | 3/2008 | Nishioka | ......................... | 380/46 |
| 2008/0172563 A1 * | 7/2008 | Stokes | ........................... | 713/193 |
| 2008/0244721 A1 * | 10/2008 | Barrus et al. | ....................... | 726/9 |
| 2009/0276771 A1 * | 11/2009 | Nickolov et al. | ............. | 717/177 |
| 2010/0191783 A1 * | 7/2010 | Mason et al. | .................. | 707/822 |
| 2011/0219048 A1 * | 9/2011 | Cross et al. | .................... | 707/821 |

OTHER PUBLICATIONS

Secure Data Deduplication (2008) by Mark W. Storer , Kevin Greenan , Darrell D. E. Long , Ethan L. Miller; STORAGESS'08.*
Jerome Wendt, Storage Channel News, "Remote Data Backup Services and Software," SearchStorageChannel.com, Jan. 10, 2007, © 2006-2008, TechTarget, 4 pages, http://searchstoragechannel.techtarget.com, printed Jun. 4, 2008, 4 pages.

(Continued)

*Primary Examiner* — Syed A. Zia (74) *Attorney, Agent, or Firm* — Campbell Stephenson, LLP (57) ABSTRACT

Various methods and systems for performing data deduplication when encrypting data for storage on an untrusted storage system are disclosed. One method involves generating an encryption key for use in encrypting data and generating an identifier for the data. Generation of the encryption key is based upon a hash of the data to be encrypted. Similarly, generation of the identifier is based upon the hash of the data to be generated. For example, the identifier can be generated by hashing the encryption key. The method then involves detecting whether an encrypted copy of the data is already stored by a storage system, based upon the identifier, and selectively encrypting the data, based upon whether the encrypted copy of the data is already stored by the storage system.

21 Claims, 4 Drawing Sheets

OTHER PUBLICATIONS

Mislove, et al., "POST: A secure, resilient, cooperative messaging system," USENIX, HotOS IX Paper, originally published in the Proceedings of HotOS IX: 9$^{th}$ workshop on Hot Topics in Operating Systems, May 18-21, last changed Aug. 26, 2003, 3 pages, http://www.usenix.org/eventshotos03/techfull_papers/mislove/mislove_html.

* cited by examiner

SECURE ENCRYPTION ALGORITHM FOR DATA DEDUPLICATION ON UNTRUSTED STORAGE

FIELD OF THE INVENTION

This invention relates to storage systems and, more particularly, to performing data deduplication on untrusted storage systems.

DESCRIPTION OF THE RELATED ART

There is a growing interest in being able to implement third-party storage systems. In such systems, an entity provides storage space to clients, who access the storage via a network. The entity can charge clients based upon the amount of storage space used by each client and/or the duration of time for which each client uses the storage space.

Typically, it is desirable for multiple different clients, who may be completely unaware of each other, to store data on the same storage system. This allows the entity providing the storage system to more efficiently utilize storage space. However, it also creates the risk that one client will be able to access another client's data.

In order to mitigate the above risk, many third-party storage systems provide a user interface that encrypts client data prior to storage. Alternatively, such systems can require that clients encrypt data prior to storage. In such systems, each client typically uses a user-specific encryption key to encrypt its data, ensuring that other clients, who do not have the same user-specific encryption key, cannot decrypt the client's data.

Unfortunately, the use of user-specific encryptions keys makes it difficult to perform data deduplication within the third-party storage system. In particular, even if multiple clients store the same file, the encrypted version of that file will differ among clients, since each version is encrypted using a different encryption key. Accordingly, opportunities to further increase the efficiency of third-party storage systems may be lost.

SUMMARY

Various embodiments of methods and systems for performing data deduplication when encrypting data for storage on an untrusted storage system are disclosed. In one embodiment, a method involves generating an encryption key for use in encrypting data and generating an identifier for the data. Generation of the encryption key is based upon a hash of the data to be encrypted. Similarly, generation of the identifier is based upon the hash of the data to be generated. For example, the identifier can be generated by hashing the encryption key. The method then involves detecting whether an encrypted copy of the data is already stored by a storage system, based upon the identifier, and selectively encrypting the data, based upon whether the encrypted copy of the data is already stored by the storage system.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Data deduplication involves reducing the number of copies of the same data that are stored by a particular storage system. For example, data deduplication can be used to achieve single-instance storage, in which only a single copy of each unique item of data is maintained on a storage system. Data deduplication can be performed by generating an identifier for each item of data, and then using that identifier as the address at which the item of data is stored. When a client attempts to store another copy of the same item of data to the storage system, the client will detect that a copy of the item of data is already stored at that address and will thus not store another copy of the item of data on the storage system.

In systems in which multiple independent clients, who may not have trusted relationships with each other or with the entity that operates the storage system, use the same storage system to store items of data, each client can maintain the security of its data by encrypting data prior to storing the data on the untrusted storage system. In these systems, the identifiers are based upon the data items themselves, such that only clients that actually have access to a particular item of data will be able to generate the identifier associated with that item of data. Accordingly, only those clients will be able to locate the item of data in the storage system. Additional information used to encrypt the item of data, such as the encryption key and/or initialization vector, can also be dependent upon the item of data itself, providing an even higher level of security.

Figure 1:
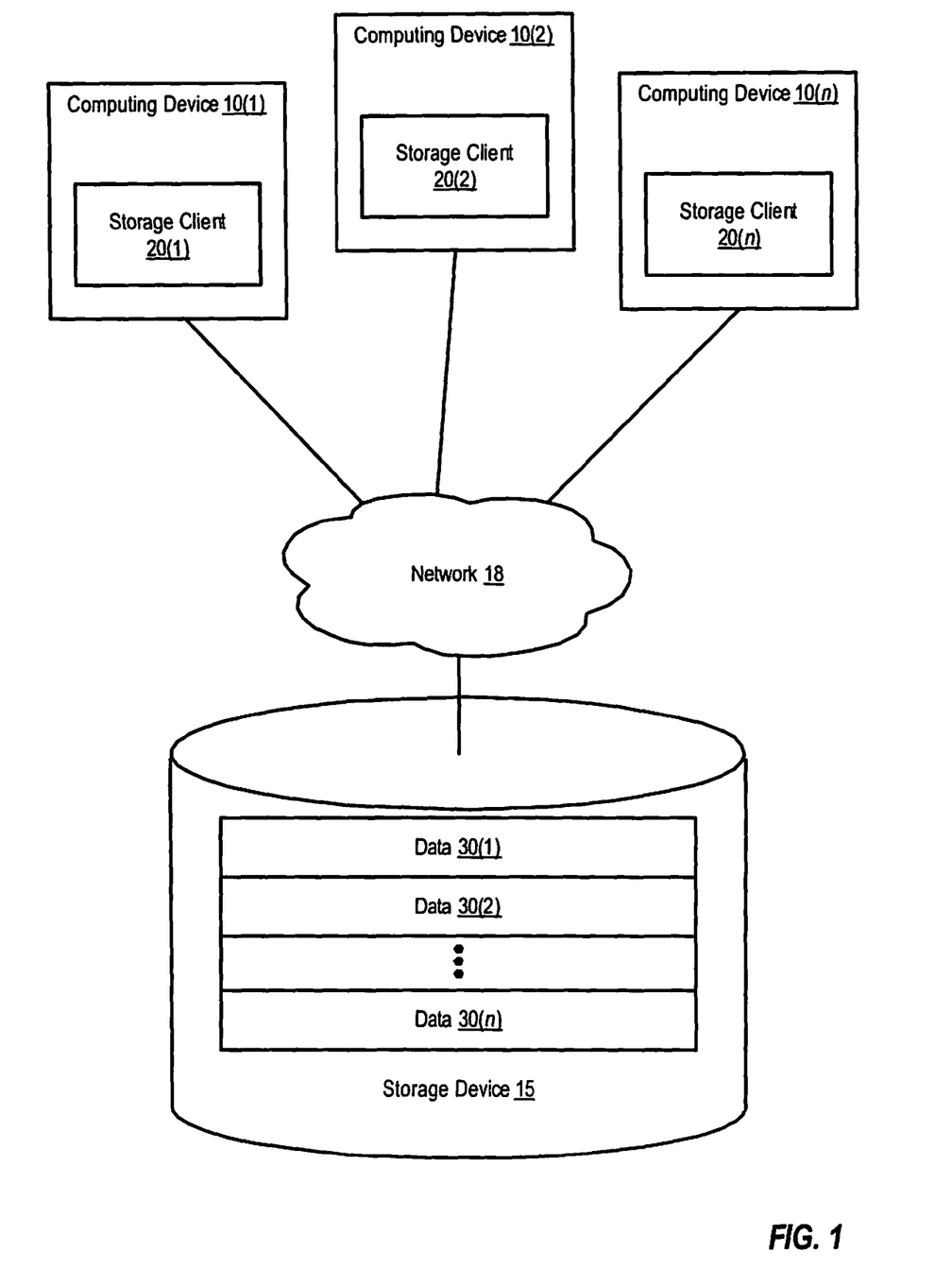
FIG. 1 is a block diagram of a system that supports data deduplication when storing encrypted data on an untrusted storage device, according to one embodiment of the present invention.

FIG. 1 illustrates a system that supports data deduplication when encrypted data is stored on an untrusted storage device. In FIG. 1, n computing devices 10(1)-10(n) are coupled to a storage device 15 by network 18. Network 18 can include a WAN (Wide Area Network), such as the Internet, one or more LANs (Local Area Networks), and/or one or more SANs (Storage Area Networks).

Each computing device implements a storage client that is configured to store encrypted client data to storage device 15 via network 18. As shown, computing device 10(1) implements storage client 20(1), computing device 10(2) implements storage client 20(2), and computing device 10(n) implements storage client 20(n).

The individual storage clients 20(1)-20(n) each store encrypted client data on storage device 15. Thus, storage client 201) on computing device 10(1) stores data 30(1), storage client 20(2) on computing device 10(2) stores data 30(2), and storage client 20(n) on computing device 10(n) stores data 30(n). In some embodiments, storage clients 20(1)-20(n) can be integrated within a file system, volume manager, or backup application.

Each computing device 10(1)-10(n) can be a personal computer, laptop computer, server, personal digital assistant, cell phone, or the like. One or more users can use each computing device to generate data, such as files, or send such data to each computing device. Copies of the data can be maintained locally (e.g., on a hard drive or other storage device or set of storage devices directly coupled to each computing device) or remotely (e.g., on a storage device coupled to a network maintained by the same entity as the computing device). The data can be generated by user applications (e.g., word processing programs, email programs, graphics programs, a database application, or the like) executing on the computing devices. Additionally, each computing device can access (e.g., read and/or write) copies of all or some of its user data on storage device 15. For example, in some embodiments, storage device 15 is used to store backups of data for each computing device.

Each computing device 10(1)-10(n) can be maintained and used by a different entity. For example, computing device 10(1) can be a laptop computer operated by an individual user in Austin, Tex., while computing device 10(2) can be a server computer system for a small business in Denver, Colo. The users of each computing device can be completely unaware of each other. Each user can also be unaware that the other users are using the storage space provided by storage device 15. These users are referred to herein as clients of the third party that operates storage device 15.

Storage device 15 provides persistent data storage. Storage device 15 can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Storage device 15 can also be a virtual or logical storage device that is implemented on such physical storage devices and/or storage systems. For example, storage device 15 can be a logical volume that is implemented on a RAID storage system. Storage device 15 can include one or more storage devices. Storage device 15 can also include one or more types of storage media, including optical media (e.g., CDs and DVDs) and magnetic media (e.g., hard disks or magnetic tape).

As noted above, storage device 15 can be maintained by a different entity than the entities that operate computing devices 10(1)-10(n). In such situations, storage device 15 can be described as a third-party storage device. This storage device is also referred to as an untrusted storage device, since there may not be an established trust relationship between the different clients and/or the third-party.

In one embodiment, the third party that operates storage device 15 provides storage as a service. In other words, the third party can sell access to and storage space on storage device 15 to clients. For example, access to the storage device can be provided by a service such as the Symantec Protection Network, available from Symantec Corporation of Cupertino, Calif.

In this example, each computing device 10(1)-10(n) is used by a different client of the storage system that includes storage device 15. These clients are not necessarily aware of each other's usage of storage device 15 and may not have any sort of relationship with each other. Accordingly, the entity that operates storage device 15 can control access to storage device 15 in a manner that ensures that different clients are not able to access each other's data.

For this reason, the third-party can provide storage clients 20(1)-20(n) to clients for the clients' use in accessing storage device 15. For example, when a client establishes a relationship with the third party in order to be able to access the third-party storage system that includes storage device 15, the third party can provide the client with a copy of a software application that includes the storage client. The storage clients 20(1)-20(n) are designed to access storage device 15 in a manner that guarantees that different clients cannot access each other's data. In particular, the storage clients can be designed to encrypt data prior to storage on the third party storage system. These storage clients 20(1)-20(n) are also designed to perform data deduplication, as described briefly above. The storage clients 20(1)-20(n) (collectively referred to herein as storage clients 20) can perform data deduplication in a manner that only stores a single copy of each item of data on storage device 15, even if more than one client tries to store the same item of data, while also maintaining the security of each client's data.

To perform data deduplication while also maintaining data security among different clients, the storage clients 20 are configured to generate identifiers, which are used to locate items of data on storage device 15 (e.g., the identifiers can be used as addresses on storage device 15), based upon the items of data to be stored themselves. The identifier generation process is configured to generate the same identifier for identical items of data, while also generating different identifiers for non-identical items of data.

In one embodiment, each storage client 20 is configured to generate an identifier for an item of data by first calculating an encryption key for the item of data (e.g., by applying a cryptographic hash algorithm to the item of data, as described in more detail below). Then, the storage client 20 calculates the identifier for the item of data, based upon the encryption key (e.g., by applying a cryptographic hash algorithm to the encryption key). The storage client 20 then provides the identifier to storage device 15 (or to a controller associated with storage device 15, if such a controller is not part of the storage device). Storage device 15 (or an appropriate controller) then returns information to storage client 20, indicating whether an item of data associated with that identifier is already stored on storage device 15. If the item of data associated with the identifier is already stored, storage client 20 does not encrypt the item of data or store the encrypted item of data on the storage device. Accordingly, if an encrypted copy of the item of data is already stored on storage device 15, processing on storage client 20 can be avoided, as can the consumption of additional space on storage device 15. If instead the item of data associated with the identifier is not already stored, storage client 20 proceeds to encrypt the item of data, using the same encryption key that was used to generate the identifier, and to store the encrypted item of data on storage device 15.

Since the encryption key and identifier associated with each item of data is calculated from the item of data itself, clients that do not have access to the item of data cannot generate the identifier or the encryption key used to encrypt the item of data. For this reason, other clients will not be able to locate (using the identifier) or decrypt (using the encryption key) the item of data. Accordingly, security of client data is preserved, while also providing data deduplication.

Data deduplication allows just a single copy of an item of data to be maintained on storage device 15, even if multiple different clients want to store a copy of that same item of data. Examples of items of data that may be shared by multiple different clients include operating system files, application binaries, media files, and the like. Accordingly, if two different clients use the same operating system and perform full backups to storage device 15, only one copy of the shared operating system file(s) will be stored on storage device 15. However, both clients will be able to access that copy, using the identifier and encryption key that each client generated from its copy of the shared operating system file.

It is noted that the third party that operates the untrusted storage device cannot access any of the data stored on that storage device, since the third party will not be able to locate or decrypt that data. Accordingly, the third party cannot expose clients' data to other parties. Furthermore, the third party cannot police or otherwise control what types of data are being stored on the untrusted storage device.

Figure 2:
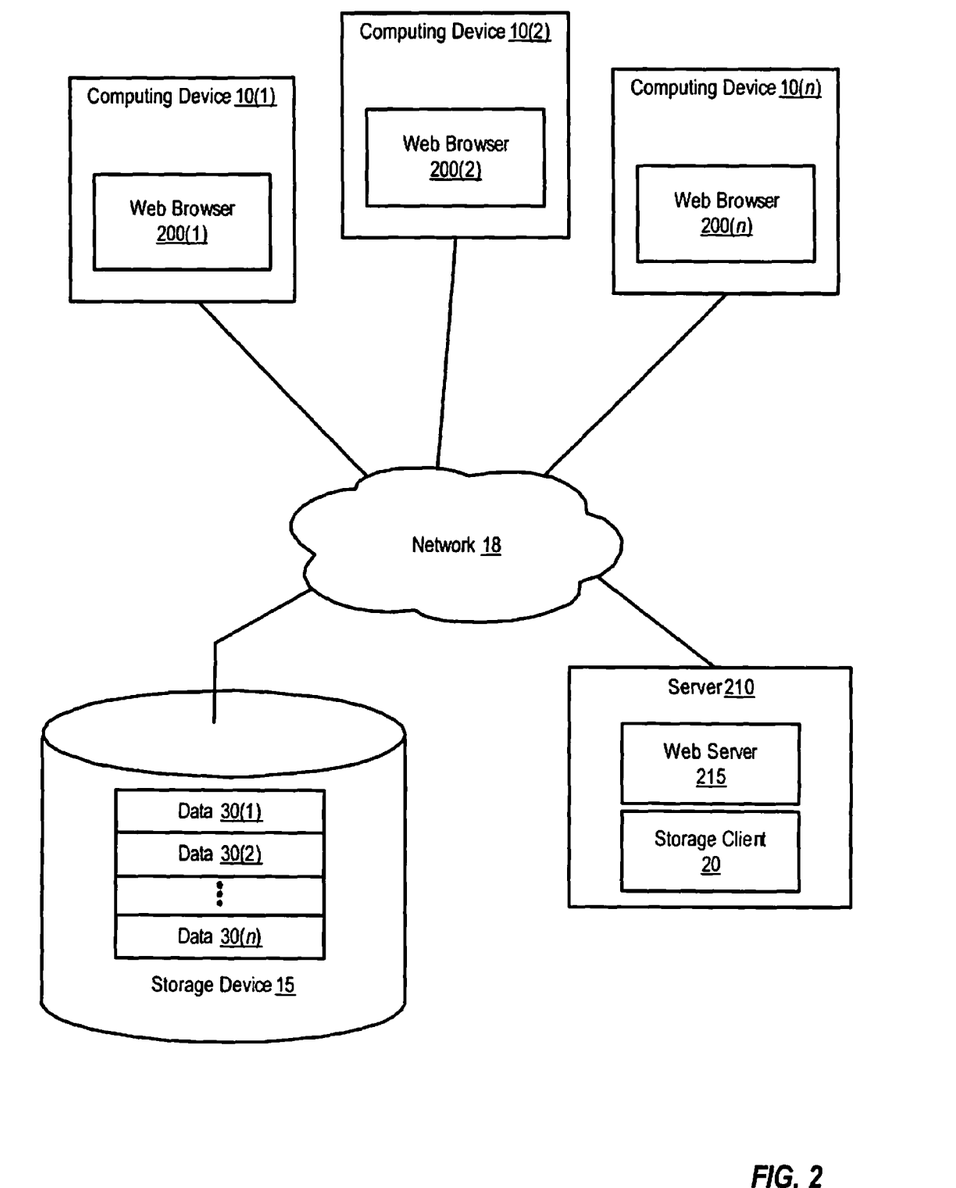
FIG. 2 is a block diagram of another system that supports data deduplication when storing encrypted data on an untrusted storage device, according to one embodiment of the present invention.

FIG. 2 illustrates another example of a system that performs data deduplication when storing encrypted data to an untrusted storage device. In this example, instead of each client's computing device executing its own storage client, a single storage client 20 executes on a server 210 coupled to network 18. Server 210 also implements a web server 215, which is configured to provide a web interface (e.g., in the form of hypertext markup language (html) pages) via which clients operating computing devices 10(1)-10(n) can interact with storage client 20 (e.g., in order to encrypt and store data on storage device 15). Accordingly, each computing device 10(1)-10(n) implements a respective web browser 200(1), which can receive and display web pages generated by web server 215 and return responsive information (e.g., selecting files or other items of data to be copied to storage device 15) to web server 215. Web server 215 can in turn provide the received information to storage client 20, which can then process the client's files in the manner described briefly above and in more detail below with respect to FIG. 3. In the system of FIG. 2, clients may initially access storage client 20 via a login and/or authentication process (e.g., implemented via web pages generated by web server 215).

It is noted that many other variations can be implemented in addition to those shown in FIGS. 1 and 2. For example, some systems may implement a combination of the two systems, in which some clients operate their own storage clients executing on their own computing devices, while other clients access a storage client executing on the third party's computing device.

Figure 3:
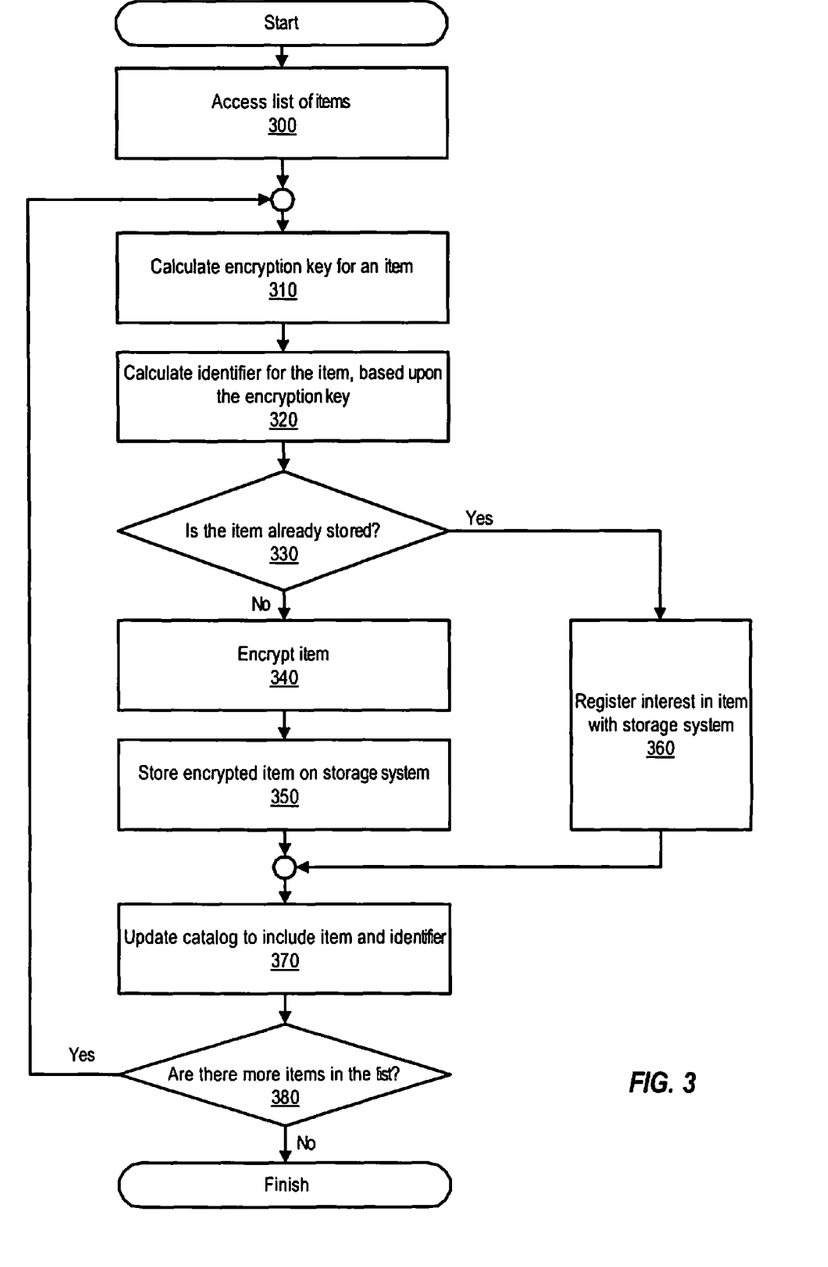
FIG. 3 is a flowchart of a method of performing data deduplication when storing encrypted data on an untrusted storage device, according to one embodiment of the present invention.

FIG. 3 is a flowchart of a method of performing data deduplication when storing encrypted data on an untrusted storage system. This method can be performed by a storage client like those shown in FIGS. 1 and 2. The method can be used to store data items securely on a third-party storage system.

The method begins at 300, when the storage client accesses a list of items of data to be stored. The list can be, for example, a list of files or blocks to be backed up to the storage system. The list can be stored in a file or other data structure accessible to the storage client. If the storage client is executing remotely from the client's computing device (e.g., as shown in FIG. 2), the list can be transferred to the storage client via a network and then accessed locally by the storage client.

The storage client can then begin processing individual items of data. In some embodiments, the storage client can process multiple items of data simultaneously. In other embodiments, items of data are processed one at a time, in a serial manner. If the items of data are located remotely from the storage client, the storage client can access the items of data via a network (e.g., the client can upload files to the storage client, or the storage client can receive information identifying a network location of files, thus allowing the storage client to retrieve the files itself).

Operations 310-370 can be performed for each individual item of data. At operation 310, the storage client calculates an encryption key for the item to be stored. The encryption key can be calculated, for example, by applying a cryptographic hash algorithm to the item of data to generate a checksum. This checksum is then used as the encryption key for the item of data. In general, generation of the checksum can be performed in any manner that is substantially likely to only generate a particular checksum for a single item of data. In other words, the checksum generation method should be performed using a technique, like hashing (the act of applying a cryptographic hash algorithm), that is likely to not provide the same output for different inputs, while also always providing the same output for the same input.

At 320, an identifier for the item of data is calculated, based upon the encryption key calculated at 310. The identifier can be used as the address to which the item of data is stored on the storage device. In one embodiment, the identifier is calculated by hashing the encryption key. The cryptographic hash algorithm used to calculate the identifier can be the same algorithm used to calculate the encryption key in some embodiments. In other embodiments, different algorithms can be used. As with calculation of the encryption key, calculation of the identifier can be performed using any technique that is likely to generate different outputs for different inputs, while also being guaranteed to always generate the same output for the same input.

At 330, the storage client determines whether the item is already stored on the storage device. The storage client makes this determination based upon the identifier calculated at 320. In particular, the storage client can provide the identifier to the storage device (e.g., as an address), and the storage device can return an indication as to whether an item of data associated with that identifier is already stored by the storage device. Based upon the response received from the storage device, the storage client will decide whether to encrypt the item of data or not.

Thus, if the item is already stored, the storage client will not encrypt the item. In some embodiments, the storage client can register an interest in the item with the storage system, as shown at 360. Registering an interest in the item tells the storage system that more than one client is interested in the item of data, and thus that the encrypted copy of that item of data should not be deleted from the storage system unless all of the clients that registered interest in the item are no longer interested. In one embodiment, registering an interest in an item is performed by sending the storage system the identifier associated with the item and causing the storage system to increment a counter associated with that identifier. Each time a client attempts to delete that item, the storage system decrements the counter but does not actually delete the item unless the counter has already reached a minimum value. If the counter has reached the minimum value, the storage system will delete the item. Alternative techniques for registering an interest can involve specifying a minimum storage time (e.g., one year) for the particular item of data.

If the item is not already stored, the storage client does encrypt the item, as shown at 340. Encrypting the item is performed based upon several inputs in addition to the item being encrypted, including the encryption key generated at 310 and an initialization vector. In one embodiment, the initialization vector is generated by using a fingerprinting technique to sample the item of data to be encrypted. The resulting sample, which is a subset of the data to be encrypted, can then be hashed to get the initialization vector. After encryption, the encrypted copy of the item of data is stored on the untrusted storage system, as shown at 350.

Regardless of whether the item actually needed to be encrypted and transferred to the storage system, the catalog (e.g., a file or other item of data that identifies each item that the client has stored on the untrusted storage system) is updated to include each processed item of data, the encryption key calculated at 310 for that item of data, and the identifier calculated at 320 for that item of data. This process is shown at 370.

If there are more items in the list, as determined at 380, the storage client repeats operations 310-370 for each additional item. Once all items have been processed, the storage client can store the finished catalog. In some embodiments, the catalog can itself be encrypted (e.g., using an encryption key that is specific to the particular client associated with that catalog) and then stored on the untrusted storage system (e.g., for disaster recovery purposes). The client only needs to keep track of one identifier, the identifier associated with the encrypted copy of the catalog, in order to be able to access all of the client's data. When the client wants to retrieve data from the untrusted storage system, the client can use that identifier to retrieve the catalog. The client can then decrypt the catalog, using the client's client-specific encryption key, in order to find the identifier and encryption key associated with the item of data that the client wishes to retrieve.

In the above examples, the identifier is generated directly from the encryption key, and the encryption key is equal to a hash of the item of data to be encrypted. In alternative embodiments, the encryption key can instead be derived from the hash of the item to be encrypted (e.g., by truncating the hash, rotating the hash, or performing some other operation or combination of operations on the hash), and the identifier can be generated from the hash and/or the derived encryption key. When the encryption key is not equal to the hash of the item to be generated, all clients are configured to derive the encryption key in the same manner, such that all clients that have access to a given item of data will generate the same encryption key for that item of data. In general, the encryption key can be described as being based upon a hash of the item of data to be encrypted, since the encryption key is either equal to the hash or derived from the hash in a manner that is consistent among clients. The identifier can also be described as being based upon the hash of the item of data to be encrypted, since the identifier is generated by processing that hash and/or processing the encryption key, which is either equal to the hash or derived from the hash.

Figure 4:
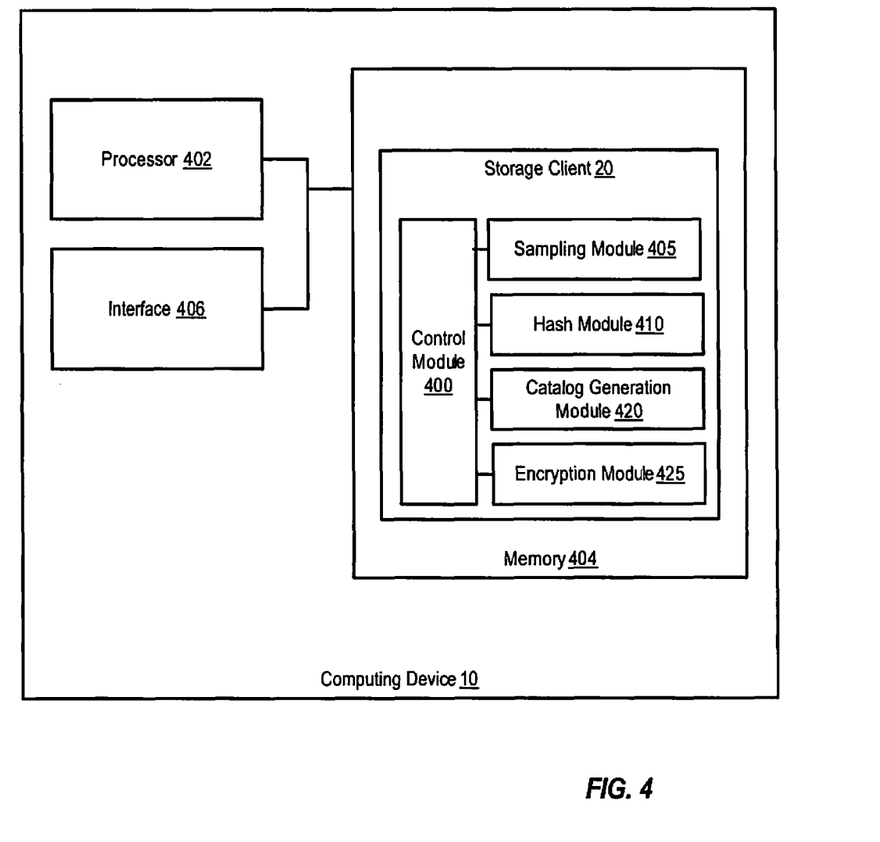
FIG. 4 is a block diagram of a computing device that implements a storage client that performs data deduplication when storing encrypted data on an untrusted storage device, according to one embodiment of the present invention.

FIG. 4 illustrates how certain elements of a storage client 20 can be implemented in software. FIG. 4 is a block diagram of a computing device 10 (e.g., one of computing devices 10(1)-10(n) of FIG. 1 or server 210 of FIG. 2). As illustrated, computing device 10 includes one or more processors 402 (e.g., microprocessors, PLDs (Programmable Logic Devices), or ASICs (Application Specific Integrated Circuits)) configured to execute program instructions stored in memory 404. Memory 404 can include various types of RAM (Random Access Memory), ROM (Read Only Memory), Flash memory, MEMS (Micro Electro-Mechanical Systems) memory, magnetic core memory, and the like. Memory 404 can include both volatile and non-volatile memory. Computing device 10 also includes one or more interfaces 406. Processor 402, interface 406, and memory 404 are coupled to send and receive data and control signals by a bus or other interconnect.

Interface 406 can include a network interface to various networks (e.g., such as network 18 of FIGS. 1 and 2) and/or interfaces to various peripheral buses. Interface 406 can also include an interface to one or more storage devices (e.g., storage device 15 of FIGS. 1 and 2). Interface 406 can, for example, be used to access information stored on storage device 15, to send identifiers to storage device 15, and to receive information from storage device 15 indicating whether an encrypted copy of an item identified by a particular identifier is already stored. Similarly, interface 406 can be used to communicate with a client's web browser or other user interface if storage client 20 is executing remotely from the client's computing device.

In this example, program instructions and data executable to implement all or part of certain storage client functionality, including a control module 400, a sampling module 405, a hash module 410, a catalog generation module 420, and an encryption module 420, are stored in memory 404.

Control module 400 is configured to control the operations of sub-modules within storage client 20. Control module 400 can also generate information usable to provide a user interface to clients (e.g., control module 400 can provide information usable to present a graphical user interface, command line interface, or web-based interface). In response to receiving information (e.g., such as the list described with respect to FIG. 3) identifying one or more items of data (e.g., files, databases, tables, blocks, extents, or the like) to be copied to an untrusted storage device, control module 400 can parse the received information and control the processing of individual items.

Hash module 410 is configured to generate the encryption key and identifier by applying one or more cryptographic hash algorithms to an item of data or data, such as an identifier, derived from the item of data. Accordingly, for each item identified in the information provided to the storage client, control module 400 can cause hash module to generate the appropriate encryption key and identifier. Control module 400 can then provide the identifier to the untrusted storage device and receive responsive information, via interface 406, indicating whether the item of data associated with that identifier is already stored on the untrusted storage device.

If the item of data is already stored, control module 400 can cause catalog generation module 410 to update the catalog of items stored on the untrusted storage device to include the identifier, encryption key, and other information (e.g., such as a file name) for the item of data. After all items have been processed, control module 400 can provide the catalog generated by catalog generation module 420 to encryption module 425 for encryption, using a client-specific encryption key, and then store an encrypted copy of the catalog on the untrusted storage device. Control module 400 can also register an interest in the item of data with the untrusted storage device, as described above.

If instead the item of data is not already stored, control module 400 can cause sampling module 405 to sample the item of data to generate an initialization vector, and then provide the encryption key generated by hash module 410 and the initialization vector generated by sampling module 405 to encryption module 425, which then encrypts the item of data based upon these inputs. Control module 400 can then cause the encrypted copy of the item of data to be stored to the untrusted storage device and cause catalog generation module 420 to update the catalog to identify the item of data as well as the identifier and encryption key generated by hash module 410.

As noted above, hash module 410 implements one or more cryptographic hash algorithms that can be applied to an item of data, or data derived from such an item of data, in order to generate a hash of that data. The resulting hash can then be used as an encryption key or identifier. In one embodiment, hash module 410 implements a version of Secure Hash Algorithm (SHA), such as SHA-1. In other embodiments, other cryptographically secure (e.g., relatively collision resistant and non-invertible) hash algorithms can be implemented. In general, hash module 410 implements a hash function that is resistant to collisions (e.g., for a 128-bit hash value size, a function that requires $2^{127}$ attempts to find a data value that hashes to the same hash value as another data value is collision-resistant) and non-invertible (e.g., given a particular hash, it is relatively difficult to reconstruct the associated data value from which that hash was generated). Examples of hash algorithms that can be used by hash module 410 include (but are not limited to) Message Digest algorithm 5 (MD5), SHA-1, SHA-224, SHA-256, SHA-384, SHA-512, Research and Development in Advanced Communications Technologies in Europe (RACE) Integrity Primitives Evaluation Message Digest (RIPEMD), RIPEMD-128, RIPEMD-160, RIPEMD-250, RIPEMD-320, and RIPEMD-512.

In some embodiments (e.g., where the cryptographic hash algorithm being used by hash module 410 operates on fixed-size units of data), at least some items of data can be broken up into sub-units of a fixed size prior to being hashed, and the cryptographic hash algorithm can be applied iteratively to successive sub-units when generating a hash of the entire item of data. If one of the sub-units is smaller than a prespecified size (e.g., this size can be the same as a fixed size of the sub-units mentioned above), a predetermined value (e.g., all ones or all zeros) can be prepended and/or appended to that sub-unit until the size of the "padded" sub-unit is equal to the prespecified size.

In such a situation, an intermediate value can be generated for each sub-unit, and the hash for the entire item of data can be generated by combining (e.g., using a bitwise XOR) the intermediate values. Alternatively, the hash can be generated by concatenating the intermediate values and then applying the cryptographic hash algorithm to the concatenated value. Other techniques can also be used to combine several intermediate values into a single hash value.

The program instructions and data implementing storage client 20 can be stored on various computer readable storage media such as memory 404. In some embodiments, such software is stored on a computer readable storage medium. Examples of such a computer readable storage medium can include non-transitory computer readable storage medium such as a CD (Compact Disc), DVD (Digital Versatile Disc), hard disk, optical disk, tape device, floppy disk, and the like. In order to be executed by processor 402, the instructions and data implementing storage client 20 can be loaded into memory 404 from the other computer readable storage medium. The instructions and/or data implementing storage client 20 can also be transferred to computing device 10 for storage in memory 404 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method of performing data deduplication on an untrusted storage device, the method comprising:
   generating an encryption key for use in encrypting data, wherein the encryption key is based upon a hash of the data to be encrypted;
   generating an identifier for the data, based upon the hash of the data to be encrypted;
   detecting whether an encrypted copy of the data is already stored by a storage system, based upon the identifier, wherein
      the storage system comprises the untrusted storage device;
   selectively encrypting the data, based upon whether the encrypted copy of the data is already stored by the storage system, wherein the encrypting comprises
      selecting a sampled subset of the data by sampling the data, and
      applying a cryptographic hash function to the sampled subset;
   generating a catalog, wherein the catalog comprises the identifier, the encryption key, and a name associated with the data; and
   encrypting the catalog using a user-specific encryption key, wherein the encrypting produces an encrypted copy of the catalog.

2. The method of claim 1, wherein the generating the encryption key comprises applying a cryptographic hash function to the data in order to generate the hash, and wherein the encryption key is the hash of the data to be encrypted.

3. The method of claim 1, wherein the generating the identifier comprising applying a cryptographic hash function to the encryption key.

4. The method of claim 1, wherein the detecting comprises:
   sending the identifier to the storage system via a network; and
   receiving information from the storage system identifying whether an encrypted copy of the data identified by the identifier is already stored by the storage system.

5. The method of claim 1, wherein the encrypted copy of the data is already stored by the storage system, the method further comprising registering an interest in the data with the storage system.

6. The method of claim 5, wherein the registering the interest in the data comprises causing a reference count associated with the data to be incremented, and wherein the storage system maintains the reference count.

7. The method of claim 1, further comprising:
   storing the encrypted copy of the catalog in the storage system.

8. The method of claim 1, wherein the generating the identifier and the generating the encryption key are performed by a client, wherein the storage system is maintained by a third party other than the client, and wherein the storage system stores data for a plurality of clients.

9. The method of claim 1, further comprising generating an initialization vector for use in encrypting the data based on the sampled subset of the data.

10. A non-transitory computer readable storage medium storing program instructions for performing data deduplication on an untrusted storage device, wherein the program instructions are executable to:

generate an encryption key for use in encrypting data, wherein the encryption key is based upon a hash of the data to be encrypted;
generate an identifier for the data, based upon the hash of the data to be encrypted;
detect whether an encrypted copy of the data is already stored by a storage system, based upon the identifier, wherein
the storage system comprises the untrusted storage device;
selectively encrypt the data, based upon whether the encrypted copy of the data is already stored by the storage system, wherein encrypting the data comprises
selecting a sampled subset of the data by sampling the data, and
applying a cryptographic hash function to the sampled subset;
generate a catalog, wherein the catalog comprises the identifier, the encryption key, and a name associated with the data; and
encrypt the catalog using a user-specific encryption key, wherein the encrypting produces an encrypted copy of the catalog.

11. The non-transitory computer readable storage medium of claim 10, wherein generating the encryption key comprises applying a cryptographic hash function to the data to generate the hash of the data, and wherein the encryption key is the hash of the data.

12. The non-transitory computer readable storage medium of claim 10, wherein generating the identifier comprising applying a cryptographic hash function to the encryption key.

13. The non-transitory computer readable storage medium of claim 10, wherein the program instructions are executable to detect whether the encrypted copy of the data is already stored by the storage system by:
sending the identifier to the storage system via a network; and
receiving information from the storage system identifying whether an encrypted copy of the data identified by the identifier is already stored by the storage system.

14. The non-transitory computer readable storage medium of claim 10, further comprising:
storing the encrypted copy of the catalog in the storage system.

15. A system for performing data deduplication on an untrusted storage device, the system comprising:
a network interface; and
a third-party storage client coupled to the network interface, wherein the third-party storage client is configured to:
generate a data identifier, based upon data to be stored on a third-party storage system, wherein
the third-party storage system comprises the untrusted storage device;
send the data identifier to the third-party storage system via the network interface;
receive information from the third-party storage system via the network interface, wherein the information indicates whether an encrypted copy of the data is already stored by the third-party storage system;
generate the encrypted copy of the data, if the encrypted copy of the data is not already stored by the third-party storage system, wherein generating the encrypted copy of the data comprises
selecting a sampled subset of the data by sampling the data, and
applying a cryptographic hash function to the sampled subset;
inhibit encryption of the data, if the encrypted copy of the data is not already stored by the third-party storage system;
generate a catalog, wherein the catalog comprises the identifier, the encryption key, and a name associated with the data; and
generate an encrypted copy of the catalog using a user-specific encryption key.

16. The system of claim 15, wherein the third-party storage client is further configured to receive user input via the network interface, wherein the user input selects the data to be stored on the third-party storage device, and wherein the user input is entered via a web browser.

17. The system of claim 15, wherein the third-party storage client is configured to generate an encryption key by applying a cryptographic hash function to the data.

18. The system of claim 17, wherein the third-party storage client is configured to generate the data identifier by applying the cryptographic hash function to the encryption key.

19. The system of claim 15, wherein the third-party storage client is configured to register an interest in the data with the third-party storage system, if the encrypted copy of the data is already stored by the third-party storage system.

20. The system of claim 15, wherein the third-party storage client is configured to:
send the encrypted copy of the catalog to the third-party storage system via the network interface.

21. The system of claim 15, wherein the third-party storage client and the third-party storage system are both operated by a third party.

* * * * *